United States Patent
Zarubaiko

(10) Patent No.: US 6,991,263 B2
(45) Date of Patent: Jan. 31, 2006

(54) ENHANCED-DRAINING AND/OR STAGNANT-POCKET-MINIMIZING INSTRUMENT TEE

(75) Inventor: Ted M. Zarubaiko, Plaistow, NH (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/714,461

(22) Filed: Nov. 14, 2003

(65) Prior Publication Data

US 2005/0104373 A1 May 19, 2005

(51) Int. Cl.
*F16L 35/00* (2006.01)

(52) U.S. Cl. ............. 285/133.11; 285/129.2

(58) Field of Classification Search .......... 285/133.11, 285/129.2; 29/890.148; 137/15.09; 4/676
See application file for complete search history.

(56) References Cited

U.S. PATENT DOCUMENTS

| | | | | |
|---|---|---|---|---|
| 12,688 A | * | 4/1855 | Oakes | 4/252.4 |
| 253,908 A | * | 2/1882 | Brady | 138/37 |
| 622,897 A | * | 4/1899 | Lawler | 138/37 |
| 977,740 A | * | 12/1910 | Higgins | 285/133.6 |
| 1,186,280 A | * | 6/1916 | Carson | 285/129.2 |
| 1,208,049 A | * | 12/1916 | Tilman | 138/37 |
| 1,209,869 A | * | 12/1916 | Murphy | 285/132.1 |
| 1,212,611 A | * | 1/1917 | Davis | 137/515.5 |
| 1,276,291 A | * | 8/1918 | Walling | 285/133.4 |
| 1,304,979 A | * | 5/1919 | Hirshstein | 285/148.23 |
| 1,362,718 A | * | 12/1920 | McNamara | 285/129.2 |
| 1,445,880 A | * | 2/1923 | Graham | 285/121.1 |
| 1,609,606 A | * | 12/1926 | Clawson | 374/148 |
| 1,796,685 A | * | 3/1931 | Edelman | 137/247.27 |
| 1,941,714 A | * | 1/1934 | Pasman | 4/696 |
| 2,065,524 A | * | 12/1936 | Groeniger | 285/125.1 |
| 2,312,659 A | * | 3/1943 | Luff | 285/129.2 |
| 2,481,376 A | * | 9/1949 | Welin-Berger | 285/133.11 |
| 3,282,102 A | * | 11/1966 | Rosaen | 73/861.75 |
| 3,346,486 A | | 10/1967 | Winter et al. | |
| 3,756,072 A | | 9/1973 | MacMurray | |
| 3,894,302 A | * | 7/1975 | Lasater | 4/696 |
| 4,330,428 A | * | 5/1982 | Clifford | 73/40.7 |
| 4,708,372 A | * | 11/1987 | Arima et al. | 285/130.1 |
| 5,157,958 A | | 10/1992 | Geisinger | |
| 5,291,863 A | | 3/1994 | Jones | |
| 5,316,349 A | | 5/1994 | Rafeld | |
| 5,540,568 A | * | 7/1996 | Rosen et al. | 417/395 |
| 5,829,880 A | | 11/1998 | Diedrich | |
| 5,992,904 A | * | 11/1999 | Hitachi et al. | 285/332 |
| 6,179,342 B1 | * | 1/2001 | Shen | 285/179 |
| 6,447,016 B2 | | 9/2002 | Collier | |

* cited by examiner

FOREIGN PATENT DOCUMENTS

GB 2207473 * 2/1989

*Primary Examiner*—Eric K. Nicholson
(74) *Attorney, Agent, or Firm*—RatnerPrestia

(57) ABSTRACT

A tee for mounting an instrument in a pipe system, the tee comprising a body member having at least one inlet and one outlet for providing a flow path through the body, and a concave surface that forms a cup in fluid communication with the flow path for providing fluid access to the instrument, wherein (a) at least one of the inlet or the outlet is positioned offset relative to a central axis of the cup, (b) the inlet is vertically offset from the outlet, or (c) a combination of (a) and (b). Piping systems having such tees, particularly with at least one tee mounted in a rolled position such that the central axis of the cup is aligned at an angle in a range of 0 to 90 degrees from vertical, are also disclosed.

20 Claims, 4 Drawing Sheets

A-A (FROM FIG. 4)

B-B (FROM FIG. 4)

A-A (FROM FIG. 8)

ENHANCED-DRAINING AND/OR STAGNANT-POCKET-MINIMIZING INSTRUMENT TEE

FIELD OF THE INVENTION

This invention relates to pipe fittings, specifically instrument tees used for mounting instruments in closed piping systems.

BACKGROUND OF THE INVENTION

Instrument tees are well known in the art for providing a mounting platform in pipelines for instruments such as thermocouples, pressure transducers, pH meters, flowmeters, and the like. As a practical matter, however, standard instruments come in many sizes and connections, and sometimes the instrument connection may be larger than the pipe or tubing line into which the instrument is mounted. This may be particularly true of small-scale processes prevalent in the pharmaceutical and biotech industries. Instrument tees used in such situations frequently resemble the "bucket-type" instrument tee 10 illustrated in FIGS. 1 and 2.

Instrument tee 10, shown in plan view in FIG. 1, comprises a body member 12 having an inlet 16 and an outlet 18 for providing a flow path through the body, and a concave surface that forms a cup 14 in fluid communication with the flow path for providing fluid access to the instrument. Cup 14 has a central axis L Inlet 16 and outlet 18 (and the resulting flow path) are aligned in a straight line L that intersects with central axis I. It should be noted that the term "fluid" as used herein refers to any process material that is of a sufficiently flowable nature that makes it appropriate for processing within a pipeline in which the instrument tee is mounted. Such a fluid may include but is not limited to a liquid, a gas, a liquid/gas mixture (such as a vapor with entrained condensate), a liquid/solid mixture (such as a dispersion or slurry), and a gas/solid mixture (for example, fluidized particles in a pneumatic conveying operation).

In many pharmaceutical or biotech processes, it is important to be able to periodically drain the system completely, often because the fluid within the piping is highly valuable and sought to be recovered or because it is necessary to completely clean the piping between batches to avoid cross-contamination. Although instrument tee 10 is capable of draining completely when the tee is mounted in a pipeline with central axis I aligned vertically, the piping configuration may not always permit a vertical installation. FIG. 2, a cross-section of tee 10 shown in FIG. 1, illustrates what happens inside instrument tee 10, when the tee has been installed in a position that is rolled along axis L so that central axis/is at a sufficiently large angle relative to vertical V. Because of the geometric configuration of region 22 pooling of material 24 occurs. The pooled material may be a liquid, such as process liquid or condensate, or a solid, such as particulate or biological material settled out of a slurry or left behind by a fluidizing gas.

In addition to the loss of product and potential contamination from batch to batch that such pooling may cause, the pooled material may also be prone to formation of living contaminants such as bacteria, mold, and the like, in some systems. Also, in liquid/solid or gas/solid systems, region 22 may be prone to build-up of sediment that is difficult to clean or remove, even upon opening the tee and removing the instrument to get access to cup 14 for a thorough cleaning. For any of these reasons, pooling may be unacceptable in many types of installations, and therefore design of piping systems and fittings to prevent pooling is desirable.

It is also important for the proper operation of an instrument tee, that the instrument tee becomes sufficiently filled and completely refreshed with process fluid so that the fluid reaches an interface with the instrument to allow the instrument to get a true reading of the process conditions. In a piping system that has been drained of any process liquid, for example, air (or other blanketing gas, referred to generally herein as "air") typically fills the piping, unless the system has been put under vacuum. It is important in many cases to avoid the formation of air pockets when filling or re-filling a piping system with process liquid. Furthermore, in other types of systems and even once a liquid system is filled, it is important to avoid stagnant pockets of fluid which may form in the cup above the flow path, depending upon the fluid dynamics of the system.

Thus, for example, instrument tee 10 may be prone to development of an air pocket or stagnant region above minimum fluid line F as shown in FIG. 2. It should be understood that the "minimum fluid line" may not just denote a liquid/gas interface, but can also denote the interface between a moving region and a stagnant region. If the probe or other sensing interface of the instrument mounted in the mounting tee does not extend down below line F and an air pocket or other stagnant region is present above line F, this is likely to adversely affect the readings provided by the instrument. In other cases, the mere presence of air in the system may pose unacceptable risks to the purity of the process materials. Accordingly, it is also desirable to design piping systems and fittings to avoid formation of air pockets or otherwise stagnant regions.

SUMMARY OF THE INVENTION

One aspect of the invention comprises a tee for mounting an instrument in a pipe system, the tee comprising a body member having at least one inlet and one outlet for providing a flow path through the body, and a concave surface that forms a cup in fluid communication with the flow path for providing fluid access to the instrument, at least one of the inlet or the outlet positioned offset relative to a central axis of the cup. In one embodiment, the inlet and the outlet may be coaxial with one another along a flow path axis, and in another embodiment the outlet may be vertically offset from the inlet, such as to provide an operating fluid level in the cup that is co-planar or higher than a level of fluid required for instrument/fluid contact.

In one embodiment, the body member has a first planar side perpendicular to the inlet, the inlet comprising a first hole in the first planar side and a first conduit attached to the first planar side in communication with the first hole. A second planar side may be opposite the first planar side and perpendicular to the outlet, the outlet comprising a second hole in the second planar side and a second conduit attached to the second planar side in communication with the second hole. For example, the body member may comprise a length of cylindrical bar stock having material removed to form the first planar side, the second planar side, the cup, the first hole, and the second hole, and in which the first conduit and second conduit are welded to the first planar side and second planar side, respectively.

Still another aspect of the invention comprises a tee for mounting an instrument in a pipe system, the tee comprising a body member having at least one inlet and one outlet for providing a flow path through the body, and a concave surface that forms a cup in fluid communication with said flow path for providing fluid access to the instrument, wherein the inlet is vertically offset from the outlet. In one embodiment, the inlet is positioned tangential to a relatively lower cross-section of the cup, and the outlet is positioned tangential to a relatively higher cross-section of the cup.

Another aspect of the invention comprises a piping system comprising one or more instrument tees of the type described above, in which at least one of the inlet or the outlet is positioned offset relative to a central axis of the cup, and/or wherein the outlet of the instrument tee is vertically offset relative to the inlet. Particularly, at least one instrument tee in the piping system may be mounted in a rolled position such that the central axis of the cup is aligned in a range of 0 to 90 degrees from vertical.

DETAILED DESCRIPTION OF THE INVENTION

Figure 1:
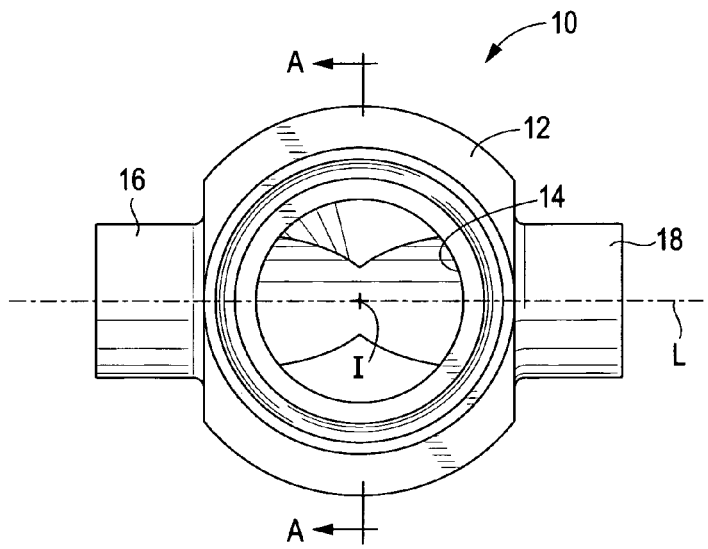
FIG. 1 is a plan view illustration of an instrument tee of the prior art.
Figure 2:
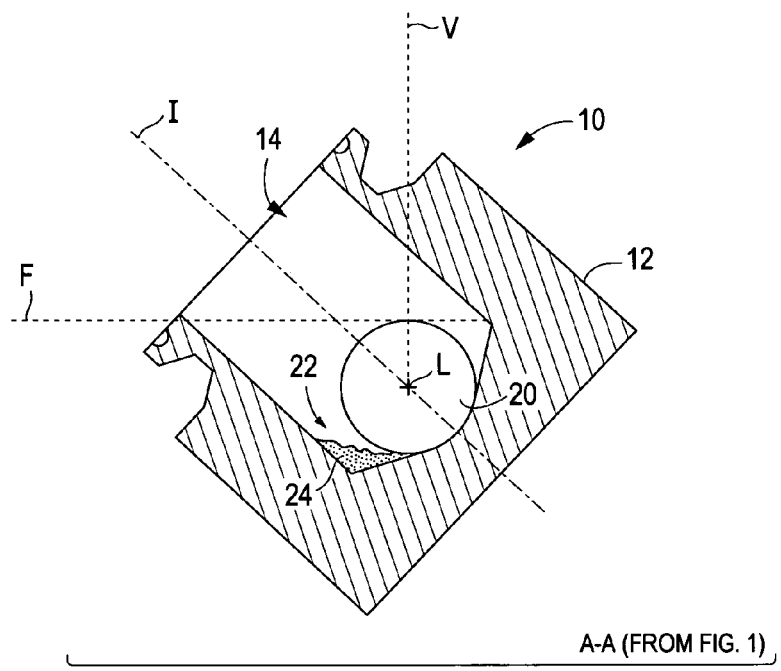
FIG. 2 depicts a cross-section of the instrument tee of FIG. 1, taken along line A—A.
Figure 3:
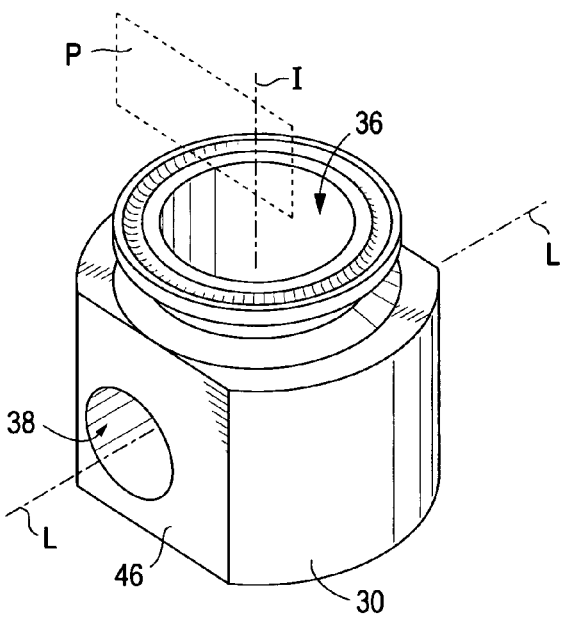
FIG. 3 is an isometric view of a body member or an exemplary instrument tee embodiment of the present invention.
Figure 4:
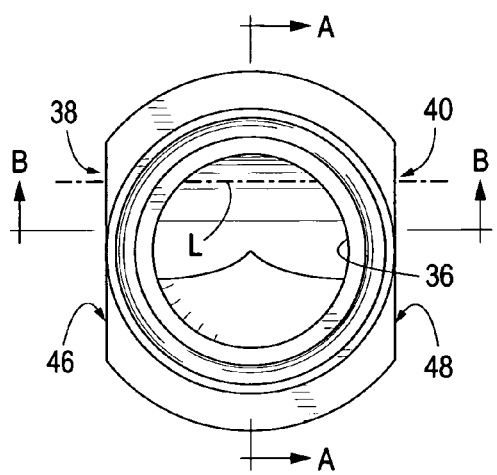
FIG. 4 is a top view of the body member depicted in FIG. 3.
Figure 7:
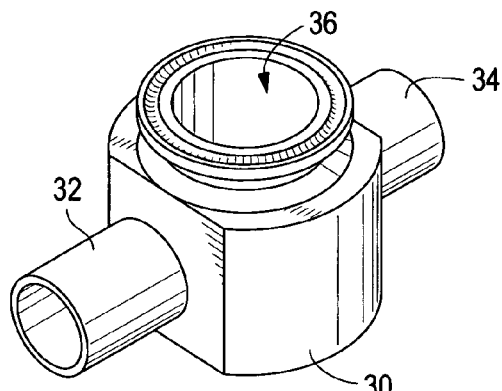
FIG. 7 is an isometric view of an exemplary instrument tee of the present invention, showing the body member with attached inlet and outlet conduit.

The invention will next be described with respect to exemplary embodiments shown in the figures. FIGS. 3–6 illustrate an exemplary instrument tee body member 30 of the present invention, and FIG. 7 illustrates the body member with attached inlet 32 and outlet 34. As shown in FIG. 3, body member 30 comprises a cup 36 having a central axis I, but inlet hole 38 and outlet hole 40 cut in body member 30 are mounted so that axis L, along which the holes are coaxially centered, is offset from central axis I rather than intersecting it. In the embodiment shown in FIGS. 3–7, central axis I lies long a plane P that is perpendicular to longitudinal axis L on which the inlet and outlet are coaxially positioned.

Figure 5:
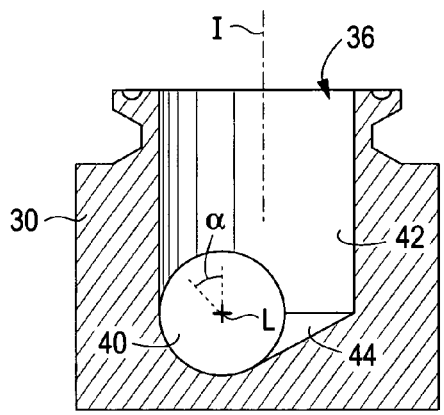
FIG. 5 is a cross-sectional view of the body member depicted in FIG. 4, taken across line A—A.
Figure 6:
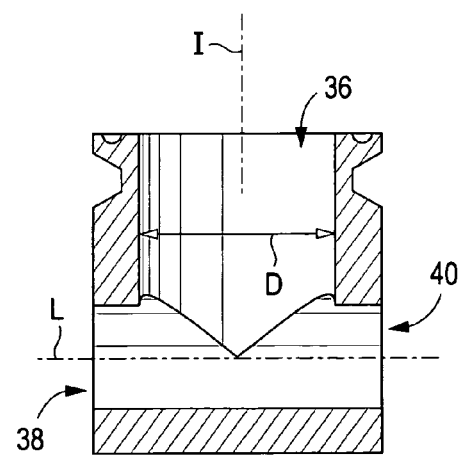
FIG. 6 is a cross-sectional view of the body member depicted in FIG. 4, taken across line B—B.

As best shown in FIG. 5, cup 36 has a cylindrical upper section 42 having a circular cross-section and also has a conical bottom section 44. Inlet hole 38 and outlet hole 40 are offset from central axis I a sufficient distance so as to be tangential to the circular cross-section of the cylindrical portion of the cup. This tangential location eliminates entirely any potential for pooling for a mounting configuration of the tee that is rolled along axis L at an angle α to vertical V in the range of 0 to 90 degrees. As used herein, "tangential" means that, for example, at least the projected circumference of hole 40 aligns tangentially with the circumference of cup as shown in FIG. 5. It should be understood, however, that hole 40 may be aligned so that a portion of the projected circumference of the hole extends radially outward (to the left in FIG. 5) relative to the circumference of the cup, the wall thickness of body member 30 permitting.

As shown in FIGS. 3–7, body member 30 may be constructed from bar stock that is drilled out to form cup 36 and that is milled to form planar sides 46 and 48. The planar sides allow the attachment of inlet conduit 32 and outlet conduit 34, typically by welding, without having to make a specialized, "fishmouthed" cut of the end of the conduit for attachment to a cylindrical external wall of the body member. Because of the desirability of forming planar sides for attachment of the inlet and outlet conduit, a larger diameter bar stock is typically used to make the offset instrument tee of the present invention than for an instrument tee of the prior art having the same cup diameter D, because the offset location of the inlet and outlet require the planar side to be wider and therefore the thickness of material cut at the center line to be deeper.

Figure 9:
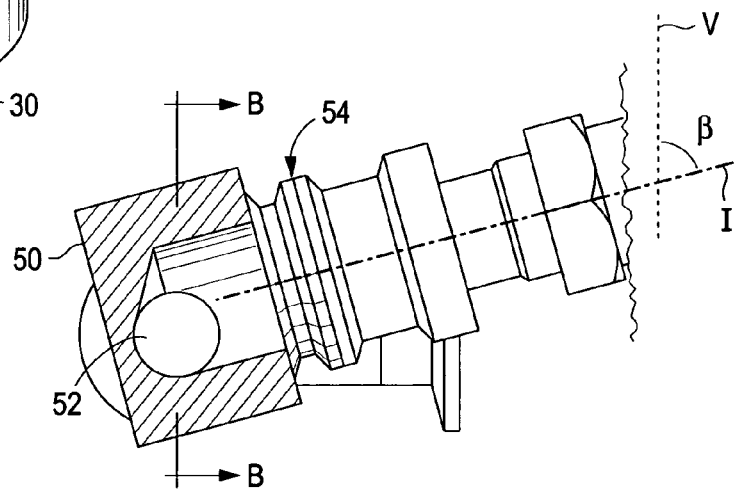
FIG. 9 is partial cross section of the instrument tee of FIG. 8, taken across line A—A.
Figure 8:
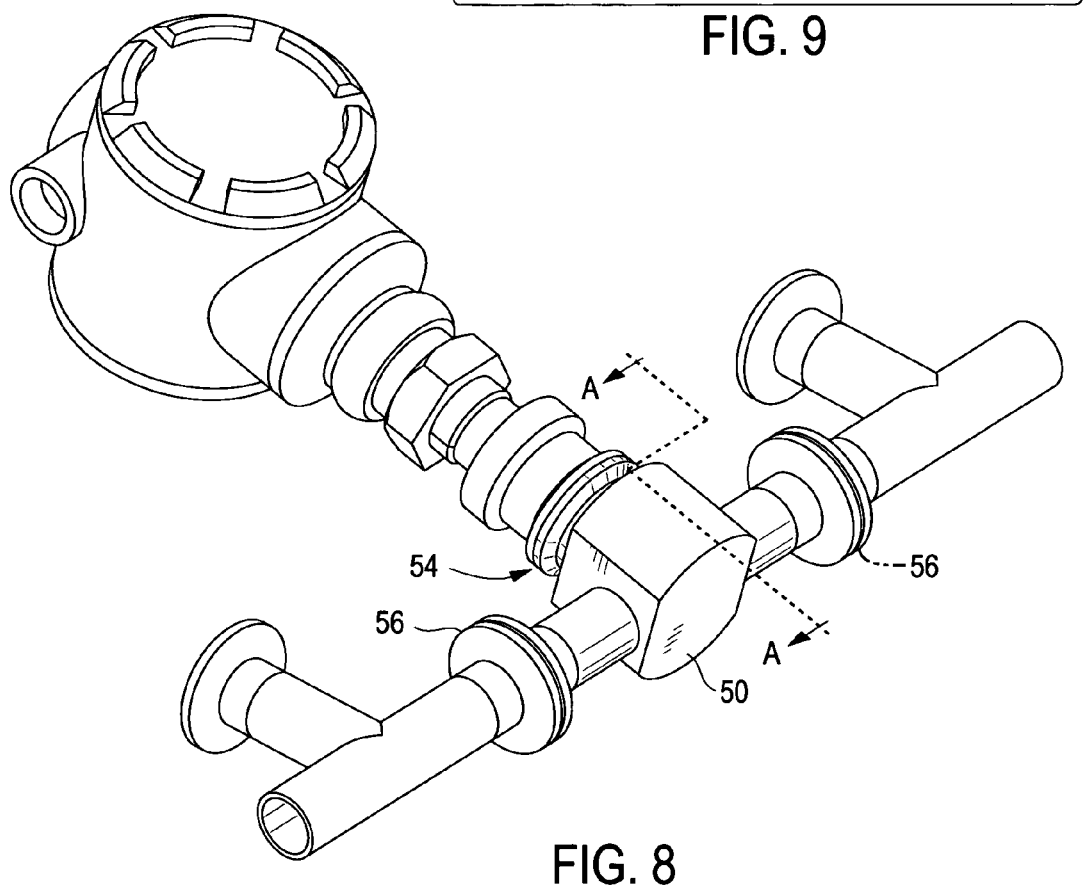
FIG. 8 an isometric view of an exemplary instrument tee of the present invention and an attached instrument installed in surrounding process piping.
Figure 10:
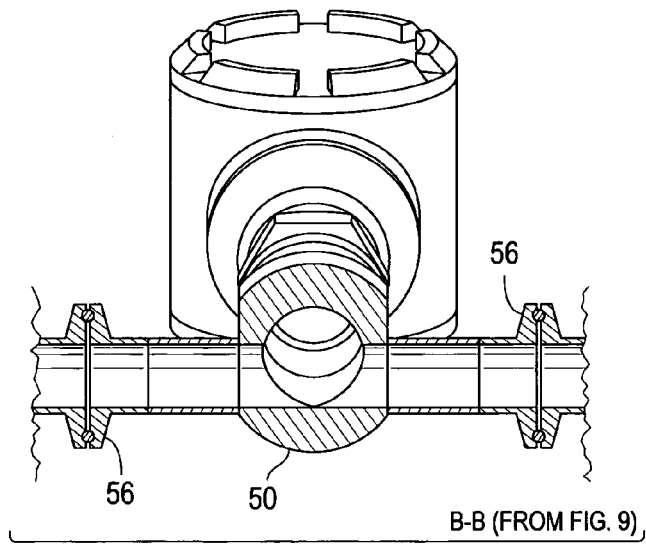
FIG. 10 is a longitudinal section of the instrument tee of FIG. 9, taken across line B—B.

FIGS. 8–10 depict an exemplary pipe installation including exemplary instrument tee 50 of the present invention. As shown in FIG. 9, the installation of tee 50 is rolled at an angle β to vertical V in a range of 0 to 90 degrees, specifically at an angle of approximately 75 degrees. There is no preferred angle, however, as the angle will be set by the need to avoid interference with surrounding structure in the piping layout. As shown in FIG. 9, even at the extreme angle of roll, inlet hole 52 is at the lowest vertical point in the cup, so no pooling can occur.

Although shown with a flanged instrument connection fitting 54 for mounting the instrument using a union clamp, such as a Sanitary TRI-CLAMP® fitting, manufactured by Tri-Clover of Kenosha, Wis., the instrument connection fitting may comprise any design known in the art. By way of example, such fittings may include, but are not limited to: "John Perry" Fittings, Bevel Seat Fittings, DC Fittings, H-Line Fittings, HDI Fittings, IPS Schedule 5 Fittings, and SWAGELOK® TS Fittings. Similarly, although shown with flanged ends 56 on the inlet and outlet in FIGS. 8 and 10, the inlet, outlet, and instrument connection ends are not limited to any particular configuration and may comprise any other type of end fitting, including stub ends for a welded connection.

Although the instrument tee may typically comprise stainless steel, which is a preferred material of construction generally for fittings used in pharmaceutical and biotech applications, the instrument tee of the present invention is not limited to use in any particular industry or to construction of any particular materials. Accordingly, the instrument tee may comprise stainless steel, carbon steel, copper, PVC, CPVC, or specialized alloys, such as but not limited to Hastalloy, titanium, and the like.

Figure 11:
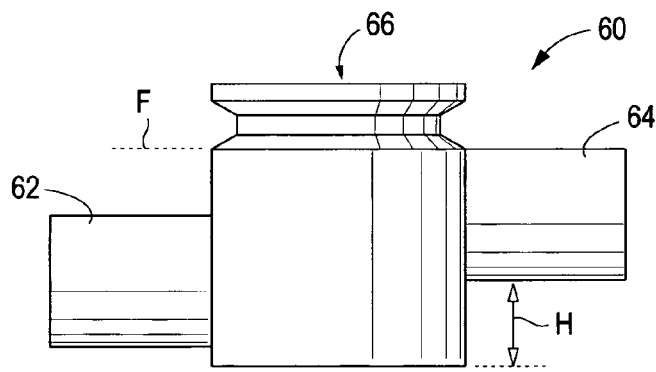
FIG. 11 is a side view of another exemplary instrument tee embodiment of the present invention.
Figure 12:
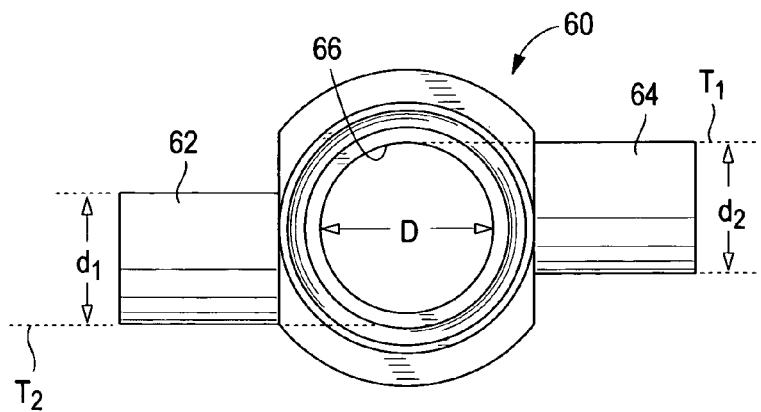
FIG. 12 is a top view of the instrument tee of FIG. 11.

Referring now to FIGS. 11 and 12, there is shown another instrument tee embodiment 60 that provides not only the ability to drain at mounting angles rolled from vertical, but also is designed to minimize air pockets or other stagnant regions in the cup. Because outlet 64 is vertically offset from inlet 62, the fluid line F is significantly higher in the cup as compared to embodiments where the inlet and outlet are both positioned at the bottom of the cup. Preferably, the placement of outlet 64 is such that fluid line F is at least as high as the level needed for instrument/fluid interface for the instrument intended for installation within the tee. As shown In FIG. 12, tangent $T_1$ along which outlet 64 is positioned is parallel to and on the opposite side of cup 66 from tangent $T_2$, along which inlet 62 is positioned. Mounting the outlet in this position maximizes the height of fluid line F for a particular vertical height H of the outlet relative to the inlet when the tee is installed in a rolled configuration.

Although depicted in FIG. 12 (and in each of the figures herein) with the inlet having an effective diameter d1 that is equal to the effective outlet diameter d2 and smaller than the effective cup diameter D, other relationships among the effective diameters may be present. For example, effective diameter d1 may not equal effective diameter d2. Also, although depicted with tubular conduit and a cylindrical cup, the conduit and/or cup may have a non-round cross section. Accordingly, the term "effective" diameter is used herein, meaning the actual diameter for a round cross section and an equivalent diameter for a non-round cross section.

Also, although depicted with a single inlet and a single outlet, the invention is not limited to any particular number of inlets or outlets. What is key, is that at least one of the inlets or outlets is mounted in an offset position relative to the center line of the cup, is vertically offset from another of the inlets or outlets, or a combination thereof.

It should be understood that although the discussed herein with respect to a configuration in which the outlet is vertically higher than the inlet, the vertical relationships may be reversed so that the inlet is vertically higher than the outlet. In fact as used herein throughout the application, the terms inlet and outlet may be interchanged and are used solely for distinguishing one side from the other. Similarly, although discussed herein with respect to inlets and/or outlets positioned tangentially relative to the circular cross-section of the cup, any position of the inlet or outlet offset from a line that intersects the central axis of the cup may be provided and may have advantages over the prior art. Also, although illustrated in embodiments with both the inlet and outlet offset from the central axis of the cup, embodiments may be provided with only one offset and the other centered. Finally, although illustrated with respect to a cup having a cylindrical cross section and a conical bottom, the cup may be cylindrical throughout its entire depth, or may comprise one or more portions having cross-sections of other geometric shapes. Similarly, although described in terms of an embodiment milled from cylindrical bar stock, instrument tees of the present invention may be manufactured in any way desired, and may further have a body member that originates from a shape that is not cylindrical in cross-section, such as for example, a square block which does not require additional milling to create planar sides.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A tee for mounting an instrument in a pipe system, said tee comprising a body member having at least one inlet having an inlet axis, at least one outlet having an outlet axis, the inlet and outlet defining a flow path through the body, and a concave surface that forms a cup in fluid communication with said flow path for providing fluid access to the instrument, the tee having a central axis that extends from a bottom of the cup through a non-flow-bearing instrument-mounting opening at a top of the tee, at least one of the inlet or the outlet positioned offset relative to the central axis such that axis of the inlet or outlet that is offset does not intersect with the central axis.

2. The tee of claim 1, wherein the inlet and the outlet are coaxial with one another along a flow path axis.

3. The tee of claim 2, wherein the central axis of the cup is located on a plane that is perpendicular to the flow path axis.

4. The tee of claim 1, wherein the outlet axis intersects with the cup in a first location having a first spacing from the bottom of the cup and the inlet axis intersects with the cup in a second location having a second spacing from the bottom of the cup, wherein there is a difference between the first spacing and the second spacing.

5. The tee of claim 4, further comprising an instrument mounted in the instrument mounting opening, the instrument extending along the central axis to a predetermined instrument level, wherein the difference between the first spacing and the second spacing is sufficient to provide an operating fluid level in the cup that is at least as high as the predetermined instrument level.

6. The tee of claim 1, wherein the cup has at least a portion having a circular cross section and at least one of the inlet or the outlet is tangential to the circular cross section.

7. The tee of claim 6, wherein both the inlet and the outlet are tangential to the circular cross section.

8. The tee of claim 7, wherein the inlet forms a first tangent and the outlet forms a second tangent parallel to the first tangent.

9. The tee of claim 8, wherein the first tangent is located on an opposite side of the circular cross section from the second tangent.

10. The tee of claim 1, wherein the body member has a first planar side perpendicular to the inlet, the inlet comprising a first hole in the first planar side and a first conduit attached to the first planar side in communication with the first hole.

11. The tee of claim 10, wherein the body member has a second planar side opposite the first planar side and perpendicular to the outlet, the outlet comprising a second hole in the second planar side and a second conduit attached to the second planar side in communication with the second hole.

12. The tee of claim 11, wherein the body member comprises a length of cylindrical bar stock having had material removed to form the first planar side, the second planar side, the cup, the first hole, and the second hole, and in which the first conduit and second conduit are attached to the first planar side and the second planar side, respectively.

13. The tee of claim 1, wherein the cup has a first effective diameter and the inlet and outlet each have an effective diameter that is smaller than the first effective diameter.

14. The tee of claim 13, wherein the inlet effective diameter is equal to the outlet effective diameter.

15. A tee for mounting an instrument in a pipe system, said tee comprising a body member having at least one inlet having an inlet axis, at least one outlet having an outlet axis, the inlet and outlet defining a flow path through the body, and a concave surface that forms a cup in fluid communication with said flow path for providing fluid access to the instrument, the tee having a central axis that extends from a bottom of the cup through a non-flow-bearing instrument-mounting opening at a top of the tee, the outlet axis intersecting with the cup in a first location having a first spacing from the bottom of the cup and the inlet axis intersecting with the cup in a second location having a second spacing from the bottom of the cup, wherein there is a difference between the first spacing and the second spacing.

16. The tee of claim 15, wherein the inlet is located tangential to a cross-section of the cup relatively closer to the bottom of the cup, and the outlet is located tangential to a cross-section of the cup relatively farther from the bottom of the cup.

17. The tee of claim 15, wherein the cup has a first effective diameter and the inlet and outlet each have an effective diameter that is smaller than the first effective diameter.

18. A piping system comprising one or more instrument tees, each instrument tee comprising a body member having an inlet having an inlet axis, an outlet having an outlet axis, the inlet and outlet defining a flow path through the body member, and a concave surface that forms a cup in fluid communication with said flow path for providing fluid access to an instrument, the tee having a central axis that extends from a bottom of the cup through a non-flow-bearing instrument-mounting opening at a top of the tee, the outlet axis intersecting with the cup in a first location having a first spacing from the bottom of the cup and the inlet axis intersecting with the cup in a second location having a second spacing from the bottom of the cup, wherein (a) at least one of the inlet or the outlet is positioned offset relative to the central axis of the cup such that axis of the inlet or outlet that is offset does not intersect with the central axis, (b) there is a difference between the first spacing and the second spacing, or (c) a combination of (a) and (b).

19. The system of claim 18, wherein at least one instrument tee is mounted in a position such that the central axis of the cup is aligned at an angle in a range of 0 to 90 degrees from a vertical axis, wherein the vertical axis is defined as an axis that intersects with the central axis and that is perpendicular to a series of fluid surface planes inherently defined whenever fluid is present in the cup.

20. The system of claim 18, wherein the piping system comprises a piping system for use in a pharmaceutical or biotech operation.

* * * * *